(12) United States Patent
Ko et al.

(10) Patent No.: US 9,066,305 B2
(45) Date of Patent: Jun. 23, 2015

(54) MOBILE COMMUNICATION DEVICE CAPABLE OF CONTROLLING OUPUT POWER AND METHOD THEREOF

(75) Inventors: Chih-Wen Ko, Taoyuan County (TW); Chien-Yen Li, Taoyuan County (TW); Wei-Yi Chiu, Taoyuan County (TW); Chih-Wei Lee, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 164 days.

(21) Appl. No.: 13/603,940

(22) Filed: Sep. 5, 2012

(65) Prior Publication Data

US 2013/0142225 A1 Jun. 6, 2013

Related U.S. Application Data

(60) Provisional application No. 61/567,225, filed on Dec. 6, 2011.

(51) Int. Cl.
  *H04B 1/38* (2006.01)
  *H04L 5/16* (2006.01)
  *H04W 52/36* (2009.01)
  *H04W 52/52* (2009.01)
  *H04B 1/40* (2015.01)

(52) U.S. Cl.
  CPC ............. *H04W 52/36* (2013.01); *H04B 1/40* (2013.01); *H04W 52/52* (2013.01)

(58) Field of Classification Search
  USPC ........................................................ 375/219
  See application file for complete search history.

(56) References Cited

U.S. PATENT DOCUMENTS

| | | | |
|---|---|---|---|
| 5,852,770 A | 12/1998 | Kasamatsu | |
| 5,974,041 A * | 10/1999 | Kornfeld et al. | 370/342 |
| 6,178,313 B1 * | 1/2001 | Mages et al. | 455/127.2 |
| 6,341,219 B1 | 1/2002 | Poirier et al. | |
| 2005/0287965 A1 * | 12/2005 | Gu | 455/127.1 |
| 2006/0002455 A1 * | 1/2006 | Johnson et al. | 375/219 |
| 2007/0015475 A1 * | 1/2007 | Schoofs et al. | 455/127.1 |
| 2008/0132294 A1 * | 6/2008 | Bennett et al. | 455/569.1 |
| 2009/0196223 A1 * | 8/2009 | Nalbantis et al. | 370/328 |
| 2012/0063495 A1 * | 3/2012 | Behzad | 375/219 |

FOREIGN PATENT DOCUMENTS

| | | |
|---|---|---|
| CN | 201813541 U | 4/2011 |
| CN | 102118846 A | 7/2011 |
| DE | 102 54 182 A1 | 1/2004 |
| EP | 0 516 453 A1 | 12/1992 |
| WO | WO 00/39935 A1 | 7/2000 |
| WO | WO 2005/036764 A1 | 4/2005 |

* cited by examiner

*Primary Examiner* — Shuwang Liu
*Assistant Examiner* — Nader Bolourchi
(74) *Attorney, Agent, or Firm* — Birch, Stewart, Kolasch & Birch, LLP

(57) ABSTRACT

A mobile communication device and a method thereof. The mobile communication device includes a processor, a transceiver circuit, an amplifier circuit, and a control logic circuit. The processor generates a baseband signal and a gain control signal. The transceiver circuit converts the baseband signal to an analog form, and amplifies the converted baseband signal to output a first transmission signal. The amplifier circuit amplifies the first transmission signal to output a second transmission signal. The control logic circuit controls the transceiver circuit and the amplifier circuit based on the gain control signal to generate the second transmission signal. The transceiver circuit adopts one of a first plurality of power gain levels at an increasing sequence when the amplifier circuit adopts a lowest level of a second plurality of power gain levels.

23 Claims, 5 Drawing Sheets

MOBILE COMMUNICATION DEVICE CAPABLE OF CONTROLLING OUPUT POWER AND METHOD THEREOF

CROSS REFERENCE TO RELATED APPLICATIONS

This application claims priority of U.S. Patent Application No. 61/567,225, filed on Dec. 6, 2011, and the entirety of which is incorporated by reference herein.

BACKGROUND OF THE INVENTION

1. Field of the Invention

The present invention relates to electronic circuits, and in particular relates to a mobile communication device and a method thereof.

2. Description of the Related Art

Transmit Power Control (TPC) is to select transmit power in a communication system to achieve good performance within the system. The transmit power control of transmission signals is typically controlled by the base station, which informs a mobile communication device of a maximum allowable level for transmission power, so that the transmission power delivered in the communication channels does not cause interference with neighboring channels, while power usage of the communication device can be managed in a controlled manner. Various communication systems such as Wireless LAN compliant with 802.11 and Long Term Evolution support the transmit power control feature.

BRIEF SUMMARY OF THE INVENTION

In one aspect of the invention, a mobile communication device is disclosed, comprising a processor, a transceiver circuit, an amplifier circuit, and a control logic circuit. The processor is configured to generate a baseband signal in a digital form, and produce a gain control signal. The transceiver circuit is coupled to the processor, configured to convert the baseband signal from the digital form to an analog form, and to amplify the converted baseband signal to output a first transmission signal at one of a first plurality of power gain levels. The amplifier circuit is coupled to the transceiver circuit, configured to amplify the first transmission signal at one of a second plurality of power gain levels to output a second transmission signal to an antenna for transmission. The control logic circuit is coupled to the processor, the transceiver circuit and the amplifier circuit, configured to receive the gain control signal from the processor and to control the transceiver circuit and the amplifier circuit based on the gain control signal to generate the second transmission signal with an overall power gain over the converted baseband signal. The transceiver circuit is configured to adopt said one of the first plurality of power gain level at an increasing sequence when the amplifier circuit adopts a lowest power gain level of the second plurality of power gain level. The control logic circuit is configured to switch the overall power gain by no more than 1-level difference.

In another aspect of the invention, a mobile communication device is provided, comprising a processor, a transceiver circuit, an amplifier circuit, and a control logic circuit. The processor is configured to generate a baseband signal in a digital form, and generate a gain control signal. The transceiver circuit is coupled to the processor, configured to convert the baseband signal from the digital form to an analog form, and to amplify the converted baseband signal to output a first transmission signal at one of a first plurality of power gain levels. The amplifier circuit is coupled to the transceiver circuit, configured to amplify the first transmission signal at one of a second plurality of power gain levels to output a second transmission signal to an antenna for transmission. The control logic circuit comprises an AND gate and an OR gate. The AND gate, coupled to the transceiver circuit, is configured to control the transceiver to amplify the converted baseband signal based on the gain control signal. The OR gate, coupled to the amplifier circuit, is configured to control the amplifier circuit to amplify the first transmission signal based on the gain control signal. The control logic circuit is configured to adopt said one of the first plurality of power gain level at an increasing sequence when the amplifier circuit adopts a lowest power gain level of the second plurality of power gain level.

In yet another aspect of the invention, a method is revealed, providing a gain control by a mobile communication device, comprising: generating, by a processor, a baseband signal in a digital form; producing, by the processor, a gain control signal; converting, by a transceiver circuit, the baseband signal from the digital form to an analog form; controlling, by a logic control circuit, the transceiver circuit and an amplifier circuit based on the gain control signal to amplify the converted baseband signal to a second transmission signal by an overall power gain at one of a plurality of power gain levels; adopting said one of the plurality of power gain level at an increasing sequence; and switching the overall power gain by no more than 1-level difference.

In still another aspect of the invention, a method is described, providing a gain control by a mobile communication device, comprising: generating, by a processor, a baseband signal in a digital form; converting, by a transceiver circuit, the baseband signal from the digital form to an analog form; generating, by the processor, a gain control signal; controlling, by an AND gate of a control logic circuit, the transceiver to amplify the converted baseband signal to a first transmission signal by one of a first plurality of power gain levels based on the gain control signal; controlling, by an OR gate of the control logic circuit, an amplifier to amplify the first transmission signal to a second transmission signal by one of a second plurality of power gain levels based on the gain control signal; adopting said one of the first plurality of power gain level at an increasing sequence when the amplifier circuit adopts a lowest power gain level of the second plurality of power gain level.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

A detailed description is given in the following embodiments with reference to the accompanying drawings.

Figure 1:
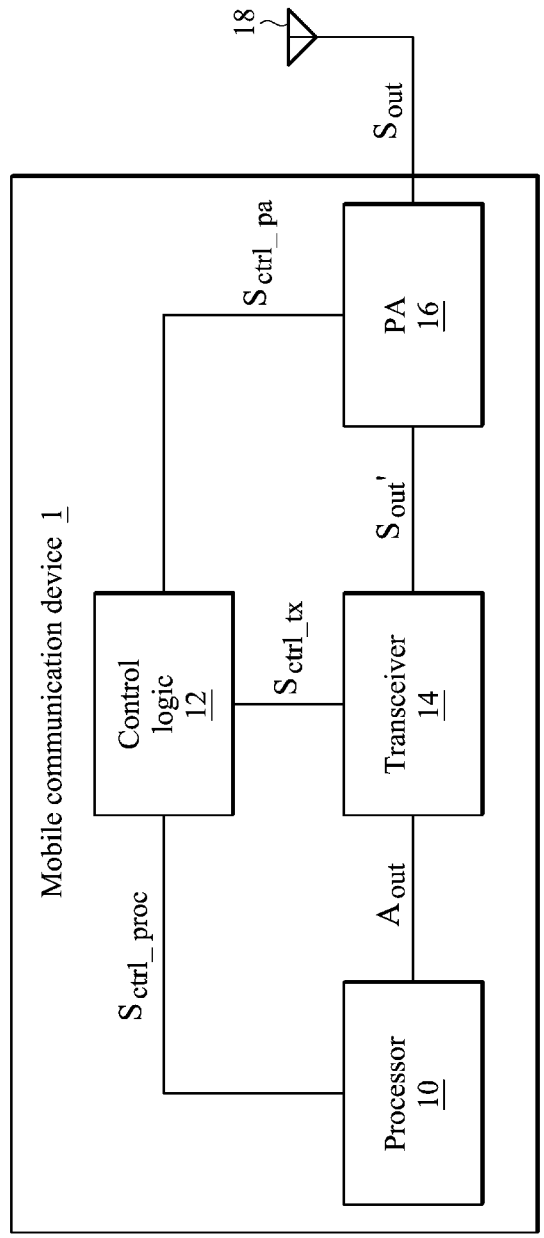
FIG. 1 is a block diagram of a mobile communication device 1.

FIG. 1 is a block diagram of a mobile communication device 1, comprising a processor 10, a control logic (control logic circuit) 12, a transceiver (transceiver circuit) 14, a power amplifier (amplifier circuit) 16, and an antenna 18. The processor 10 is coupled to the control logic 12 and the transceiver 14. The control logic 12 is further coupled to the transceiver 14 and PA 16, which is then coupled to the antenna 18 for transmitting an outgoing signal $S_{out}$ through the air interface to a receiving end (not shown). The mobile communication device can be hand-held phone, a laptop computer equipped with a mobile broadband adapter, or any other device capable of performing wireless communication. The receiving end may be a base station or another mobile communication device.

During outgoing data transmission, the processor 10 outputs baseband data $A_{out}$ to transceiver 14, where the baseband data $A_{out}$ undergoes various signal processing including up-conversion, other filtering processes, and first stage power amplification to be transformed into an outgoing signal $S_{out}'$. However, the power amplification provided by the transceiver 14 is very basic and cannot meet the power requirement for the outgoing signal $S_{out}$ to be transmitted across the air interface to reach the receiving end. Thus, the PA 16 is incorporated to apply further power amplification to the output signal $S_{out}'$ of the transceiver 14 and produces the outgoing transmission signal $S_{out}$ with a wanted transmit power level. The processor 10 selects power levels for the transceiver 14 and PA 16 through the control logic 12. The control logic 12 comprises combinational digital logic that produces control signal $S_{ctrl\_tx}$ to control output power level of the transceiver 14 and produces control signal $S_{ctrl\_pa}$ to control output power level of the PA 16. In some implementations, the transceiver 14 is capable of supplying two output power levels (first plurality of power gain levels), and the PA 16 can supply three output levels (second plurality of power gain levels). As a consequence, the outgoing signal $S_{out}$ has 6 possible power output levels. For examples, the transceiver 14 can provide 7 dBm or −3 dBm of power levels, the PA 16 can provide 9 dB, 15 dB, or 24 dB of power gain levels, and the possible power output switch levels for the outgoing signal $S_{out}$ include 6 dBm, 16 dBm, 12 dBm, 22 dBm, 21 dBm, and 31 dBm. The transceiver 14 and PA 16 can only switch the power level in a stepwise and sequential order, and the output power level of the outgoing signal $S_{out}$ can only be switched in a stepwise and sequential order. The transceiver 14 is configured to adopt the power gain level thereof at an increasing sequence when the amplifier 16 adopts a lowest power gain level of the 3 possible power gain levels. The transceiver 14 is capable to adopt a lowest power gain level from the 2 possible power gain levels thereof only if the amplifier 16 has adopted the lowest power gain level of the 3 possible power gain level thereof. For examples, the PA 16 can only switch the power gain level from 9 dB to 15 dB, but not from 9 dB to 24 dB since the power gain levels 9 dB and 24 dB are two steps apart. The possible output power levels of the outgoing signal $S_{out}$ follows a sequentially incremental order. In some implementations, the possible power switch levels are 6 dBm, 16 dBm, 22 dBm, and 31 dBm. In other implementations, the possible power switch levels are 6 dBm, 12 dBm, 22 dBm, and 31 dBm. The control logic 12 receives the control signal $S_{ctrl\_proc}$ to generate the control signals $S_{ctrl\_tx}$ and $S_{ctrl\_pa}$ to select the output power levels for the transceiver 14 and PA 16 respectively, thereby delivering one of possible power levels for the outgoing signal $S_{out}$.

Although FIG. 1 only shows the circuits and blocks for outgoing transmission, it should be appreciated that the mobile communication device 1 can also incorporate circuits and blocks for incoming transmission without deviating from the principle of the invention.

Figure 2:
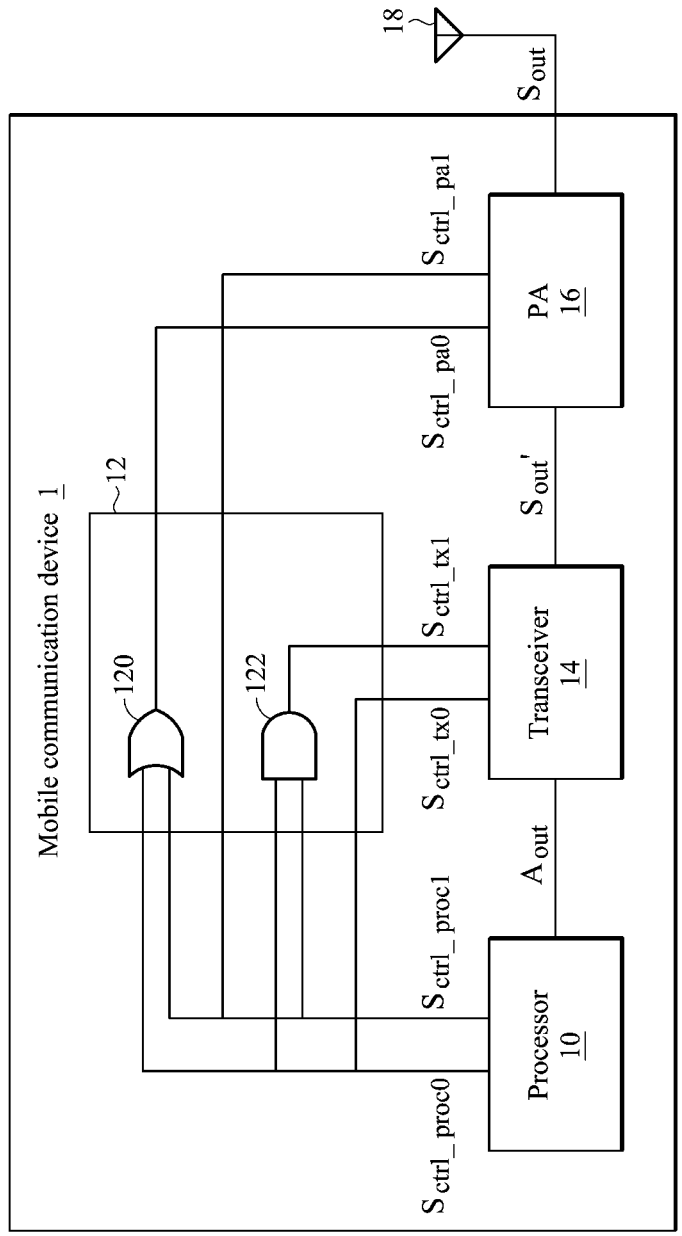
FIG. 2 shows exemplary implementation of the control logic 12.

FIG. 2 shows exemplary implementation of the control logic 12, with the processor 10, the control logic 12, the transceiver 14, the PA 16 and the antenna 18 being configured and operated identical to corresponding circuit blocks in FIG. 1. The control logic 12 comprises an OR gate 120 and an AND gate 122. The control logic 12 receives the control signal $S_{ctrl\_proc}$ that comprises two bits $S_{ctrl\_proc0}$ and $S_{ctrl\_proc1}$ to generate the transmitter control signal $S_{ctrl\_tx}$ comprising two bits $S_{ctrl\_tx0}$ and $S_{ctrl\_tx1}$ and the PA control signal $S_{ctrl\_pa}$ comprising two bits $S_{ctrl\_pa0}$ and $S_{ctrl\_pa1}$. In the embodiment, the AND gate 122 produces the transmitter controller bit $S_{ctrl\_tx1}$ by performing AND operation on the processor control bits $S_{ctrl\_proc0}$ and $S_{ctrl\_proc1}$, the OR gate 120 produces the power amplifier controller bit $S_{ctrl\_pa0}$ by performing OR operation on the processor control bits $S_{ctrl\_proc0}$ and $S_{ctrl\_proc1}$. The transceiver 14 obtains the transmitter controller bit $S_{ctrl\_tx0}$ from the processor controller bit $S_{ctrl\_proc0}$ and the transmitter controller bit $S_{ctrl\_tx1}$ from the output of the AND gate 122. The PA 16 obtains the transmitter controller bit $S_{ctrl\_pa0}$ from the output of the OR gate 120 and the transmitter controller bit $S_{ctrl\_pa1}$ from the processor controller bit $S_{ctrl\_proc1}$. Table 1 shows relationship of the processor control bits and the corresponding transceiver control bits and the PA control bits generated by control logic 12.

TABLE 1

| | processor 10 | | transceiver 14 | | | power amplifier 16 | | | Overall power switch (dBm) |
|---|---|---|---|---|---|---|---|---|---|
| Power mode | $S_{ctrl\_proc0}$ | $S_{ctrl\_proc1}$ | $S_{ctrl\_tx0}$ | $S_{ctrl\_tx1}$ | Power (dBm) | $S_{ctrl\_pa0}$ | $S_{ctrl\_pa1}$ | Power gain (dB) | |
| High Power Mode | 0 | 0 | 0 | 0 | 7 | 0 | 0 | 24 | 31 |
| Mid Power Mode | 1 | 0 | 1 | 0 | 7 | 1 | 0 | 15 | 22 |
| Bypass Mode 2 | 0 | 1 | 0 | 0 | 7 | 1 | 1 | 9 | 16 |
| Bypass Mode 1 | 1 | 1 | 1 | 1 | −3 | 1 | 1 | 9 | 6 |
| Shut Down Mode | 0 | 0 | — | — | — | 0 | 0 | 0 | 0 |

Figure 3:
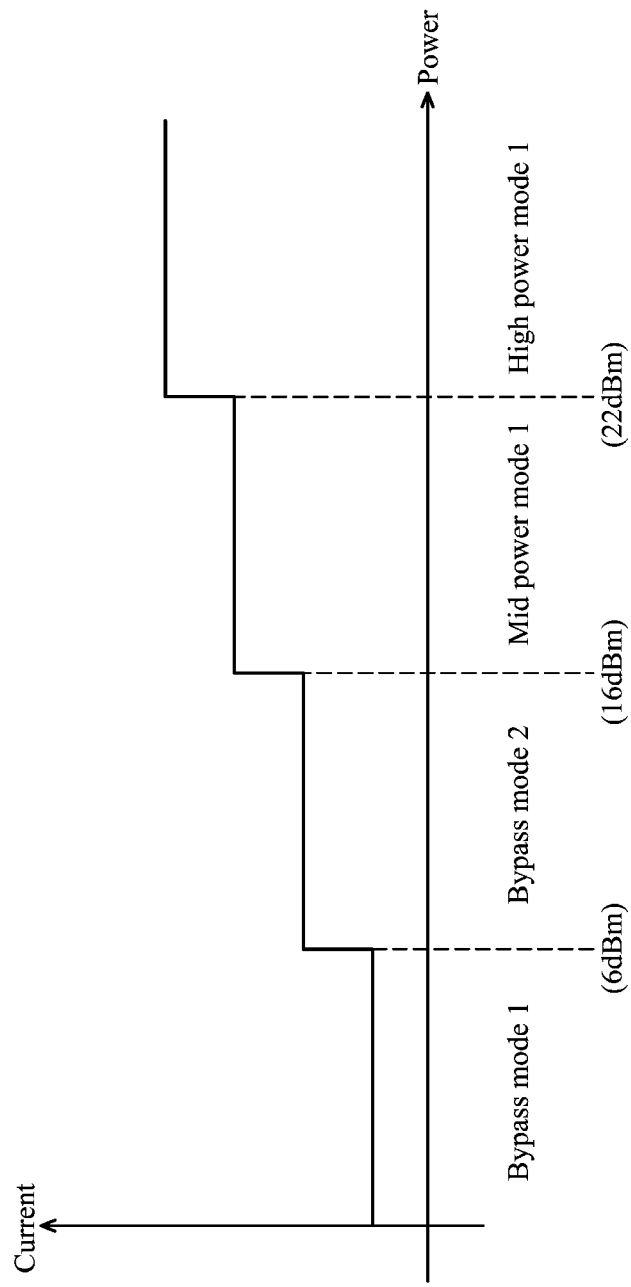
FIG. 3 shows a relationship of the four power gain modes and corresponding currents.

When the mobile communication device 1 is active and powered on, there are four power modes to be selected from, namely a bypass mode 1, a bypass mode 2, a mid power mode, and a high power mode. Accordingly, each active power mode thereof provides an overall power switch of 6 dBm, 16 dBm, 22 dBm, and 31 dBm respectively. FIG. 3 shows relationship of the four power gain modes and corresponding currents therefore. As the processor 10 switches the power mode toward higher power gain, the overall current drawn by higher power gain also increases accordingly. The transceiver 14 can be switched to high power mode (7 dBm) and the power amplifier 16 is switched to the lowest gain mode (9 dB) to provide the bypass mode 2 between the bypass mode 1 and mid power mode. The switch between the power modes has to follow an increment or decrement sequence order of the power modes. For example, the processor 10 can select the processor control bits to switch from the bypass mode 2 to the mid power mode, or from the high power mode to the mid power mode. During the transmit power control, the processor 10 can select a power mode from the four power modes to accommodate the power allocated by the base station. However, in order to provide good signal performance for the outgoing signal $S_{out}$, the processor 10 cannot select the processor control bits to switch from the bypass mode 1 to the high power mode directly, but has to follow the sequence order of the bypass mode 1, bypass mode 2, mid power mode, to the high power mode.

The embodiment of the present invention offers four power modes to be selected from in a mobile communication device, so that appropriate power level can be allocated to the outgoing signal $S_{out}$, thereby decreasing signal interference and reserving the limited battery power.

Referring now to FIG. 1, the mobile communication device 1 comprises the processor 10 (controller), the control logic circuit 12, the transceiver 14 (transceiver circuit), the amplifier 16 (power amplifier circuit), and the antenna 18. The mobile communication device 1 may be implemented in a cellular phone, a tablet computer, a handheld entertaining device, and other wireless communication devices.

When the mobile communication device 1 performs an outgoing data transmission in a transmission session, the processor 10 transmits the control signal $S_{ctrl\_proc}$ corresponding to a predetermined transmit power to the control logic circuit 12, and sends the outgoing data $A_{out}$ (baseband signal) to the transceiver 14 for data conversion, pre-amplification, and other filtering processes. The control signal $S_{ctrl\_proc}$ may comprise a two-bit binary siganl [$S_{ctrl\_proc1}$, $S_{ctrl\_proc0}$]. The control logic circuit 12 contains a combinational logic circuit that transforms the two-bit control signal into the two-bit binary transceiver gain control signal [$S_{ctrl\_tx1}$, $S_{ctrl\_tx0}$] and the two-bit binary amplifier gain control signal [$S_{ctrl\_pa1}$, $S_{ctrl\_pa0}$], which respectively control power gains for the transceiver 14 and the power amplifier 16. The outgoing data $A_{out}$ is a baseband data to be transmitted to a communication service network. The transceiver 14 receives the outgoing data $A_{out}$, to which various signal processing including digital-to-analog conversion, carrier modulation, other filtering, and a preliminary power amplification is performed, generating the first communication signal $S_{out}'$. The power amplifier 16 takes the output signal to perform a further power amplification before sending the second communication signal $S_{out}$ for the data transmission via the antenna 18. Specifically, the transceiver 14 amplifies the outgoing data $A_{out}$ by a transceiver gain by the transceiver gain control signal [$S_{ctrl\_tx1}$, $S_{ctrl\_tx0}$]. The power amplifier 16 amplifies the output signal $S_{out}'$ from the transceiver 14 by the amplifier gain control signal [$S_{ctrl\_pa1}$, $S_{ctrl\_pa0}$]. The power amplification gain boosted by the power amplifier 16 typically exceeds that by the transceiver 14. The transceiver 14 can only provide a preliminary power boost of 7 dBm or −3 dBm to the outgoing data $A_{out}$, or, when $S_{ctrl\_tx1}$ indicates b'1 the transceiver 14 decreases the power gain by −3 dBm, when $S_{ctrl\_tx1}$ indicates b'0 the transceiver 14 increases the power gain by 7 dBm. On the other hand, the power amplifier 16 can provide considerably greater power amplification to the first communication signal $S_{out}'$ of the transceiver 14. Specifically, the power amplifier 16 can provide 3 different levels of power amplification at 9 dB, 15 dB, and 24 dB, selected by the amplifier gain control signal [$S_{ctrl\_pa1}$, $S_{ctrl\_pa0}$].

In order to preserve good linearity, the power amplifier 16 has to be switched from one level to the next in a sequential manner, either by an incremental or decremental order, i.e., the power amplifier 16 is configured to switch the amplifier gain by no more than 1-level difference. For example, the amplifier gain can be switched from 9 dB to 15 dB, remain at 9 dB, but not to be switched from 9 dB to 24 dB. Similarly, the overall power gain, measured by the power ratio of the second communication signal $S_{out}$ to the analogly converted outgoing data in the transceiver 14, is required to be adjusted by no more than 1-level difference at any time to provide the linearity.

In some embodiments, the transceiver power gain can be adjusted to the lowest level only when the amplifier power gain is at the lowest level, or, the transceiver power gain can be adjusted to −3 dBm only when the power amplifier power gain is 9 dB. Consequently there are only 4 possible levels of power amplification for the overall power gain of the mobile communication device 1, namely 6 dBm, 16 dBm, 22 dBm, and 31 dBm. Accordingly, the control logic circuit 12 can receive the control signal [$S_{ctrl\_proc1}$, $S_{ctrl\_proc0}$] to generate the transceiver gain control signal [$S_{ctrl\_tx1}$, $S_{ctrl\_tx0}$] and the amplifier gain control signal [$S_{ctrl\_pa1}$, $S_{ctrl\_pa0}$] to control the transceiver gain and the PA gain of the transceiver 14 and the power amplifier 16 respectively, such that the overall power gain can only be switched by 1-level difference or less at a time. For example, the overall power gain can be adjusted from 6 dBm to 16 dBm, from 16 dBm to 22 dBm, 22 dBm to 31 dBm or remaining as the previous level.

The control logic circuit 12 comprise combinational logics, such as an AND gate connected to the transceiver 14 and an OR gate connected to the power amplifier 16. The AND gate and the OR gate receive the gain control signal [$S_{ctrl\_proc1}$, $S_{ctrl\_proc0}$] from the processor 10 to generate the corresponding transceiver and power amplifier control signals, rendering the overall power gain at one of the four possible levels.

The mobile communication device 1 offers a power amplification solution for amplifying the power of the input signal by 4 possible levels, while providing good linearity of the device.

Referring now to FIG. 2, the mobile communication device 2 illustrates a circuit implementation for the control logic circuit 12, which comprises the AND gate 122 coupled to the transceiver 14 and the OR gate 120 coupled to the power amplifier 16. The control logic circuit 12 contains only two logic gates that generate the transceiver gain control signal [$S_{ctrl\_tx1}$, $S_{ctrl\_tx0}$] for configuring the transceiver power gain for the transceiver 14 and the power amplifier gain control signal [$S_{ctrl\_pa1}$, $S_{ctrl\_pa0}$] for configuring the power gain for the power amplifier 16. The rest of the circuits in the FIG. 2 are identical to those corresponding element circuits in the FIG. 1. In the embodiment, the transceiver power gain has 2 possible levels (first plurality of power gain levels), the power amplifier power gain has 3 possible levels (second plurality of power gain levels), and the overall power gain has 4 possible power gain levels. The control logic circuit 12 configures the power gains for the transceiver 14 and the power amplifier 16 by the transceiver and power amplifier gain control signals so that the overall power gain can only be switched by 1-level difference or less at a time, thereby preserving the linearity of the power amplification. Likewise, the power amplifier gain for the power amplifier 16 can only be switched by no more than 1-level difference. In order to satisfy the condition for both the overall power gain and the power amplifier gain, the transceiver power gain can be adjusted to the lowest level only when the amplifier power gain is at the lowest level. Further, the transceiver 14 is configured to adopt the power gain level thereof at an increasing sequence when the amplifier 16 adopts a lowest power gain level of the 3 possible power gain levels. The transceiver 14 is capable to adopt a lowest power gain level from the 2 possible power gain levels thereof only if the amplifier 16 has adopted the lowest power gain level of the 3 possible power gain level thereof.

The mobile communication device 1 is configured to amplify the power of the input signal by one of the four possible levels, while providing good linearity of the device.

Figure 4:
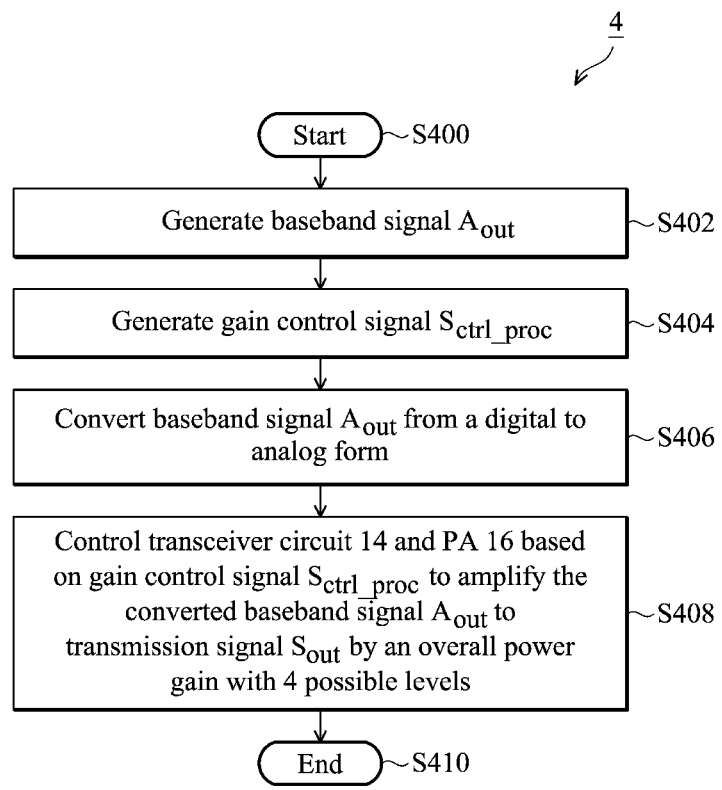
FIG. 4 is a flowchart of a gain control method 4 according to an embodiment of the invention.

FIG. 4 is a flowchart of a gain control method 4 according to an embodiment of the invention, incorporating the mobile communication device 1 in FIG. 1.

Upon startup of the gain control method 4, the mobile communication device 1 is initialized for the outgoing transmission (S400). The processor 10 generates a baseband signal $A_{out}$ for the outgoing transmission, including control data and transmission data for establishing a communication session with the communication service network, and outputs the baseband signal $A_{out}$ to the transceiver 14 for further mixed signal and analog processing (S402). The communication service network may inform the mobile communication device 1 of the allocated transmit power before the transmission starts. In response, the processor 10 can generate the gain control signal $S_{ctrl\_proc}$ according to the allocated transmit power for the mobile communication device 1 and pass the gain control signal $S_{ctrl\_proc}$ to the control logic circuit 12 to control the power gain of the outgoing signal $S_{out}$ (S404). The transceiver 14 can convert the baseband signal from digital to analog (S406), up-convert the analog signal according to carrier signal, and filters unwanted components in the up-converted signal, perform a preliminary power amplification with the transceiver amplification gain (S408), and output the resultant signal $S_{out}'$ to the next power boost stage. Next, the PA 16 can obtain the intermediate signal $S_{out}'$ and perform a further power amplification to the intermediate signal $S_{out}'$ with the PA amplification gain to generate the transmission signal $S_{out}$, which is to be transmitted to the communication service network via the antenna 18 (S408). The gain control method 4 is completed and exited at Step S410.

The converted baseband signal $A_{out}$ is amplified by the overall power gain with one of four possible levels to render the transmission signal $S_{out}$. Accordingly, the four possible levels may be 6 dBm, 16 dBm, 22 dBm, and 31 dBm selected by the transceiver gain control signal $S_{ctrl\_tx}$ and the PA gain control signal $S_{ctrl\_pa}$, which are computed by the control logic circuit 12 according to the gain control signal $S_{ctrl\_proc}$ by the relation shown in the Table 1. The power amplifier gain for the power amplifier 16 can only be switched by no more than 1-level difference. Similarly, the overall power amplifier gain for the mobile communication device 1, measured by a power ratio of the transmission signal $S_{out}$ to the converted baseband signal $A_{out}$, can only be switched by no more than 1-level difference. In order to satisfy the condition for both the overall power gain and the power amplifier gain, the transceiver power gain can be adjusted to the lowest level only when the amplifier power gain is at the lowest level.

Figure 5:
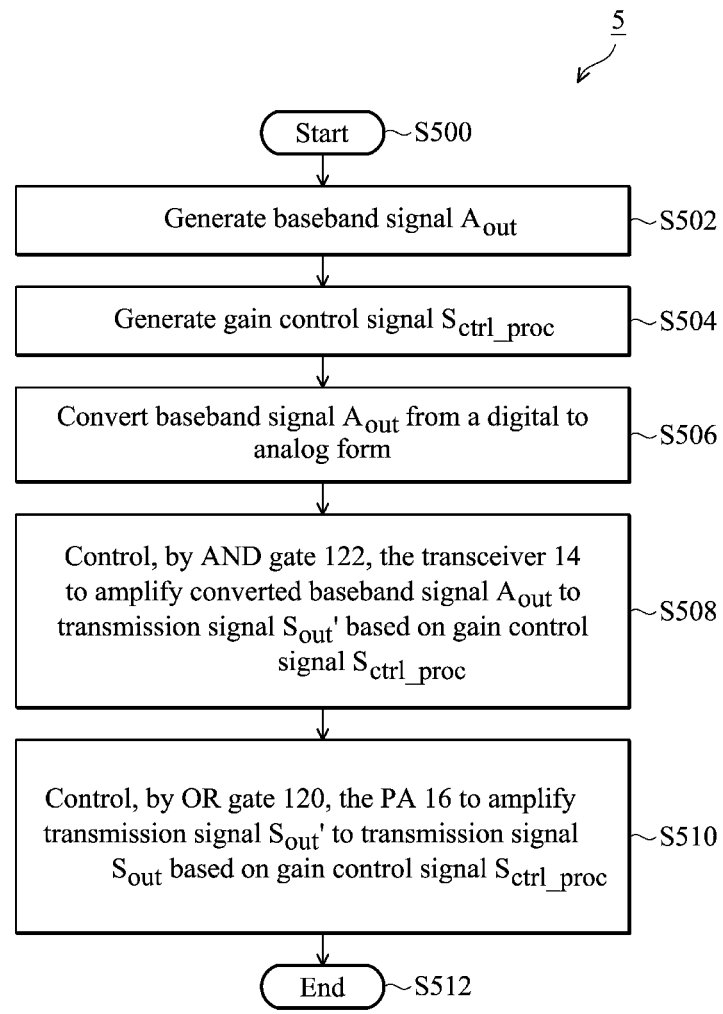
FIG. 5 is a flowchart of a gain control method 5 according to another embodiment of the invention.

FIG. 5 is a flowchart of a gain control method 5 according to another embodiment of the invention, incorporating the mobile communication device 2 in FIG. 2.

The gain control method 5 is similar to the gain control method 4, except in Step S508 and Step S510 the detailed operations in the control logic circuit 12 are specified. In Step S508, the control logic circuit 12 can control the transceiver power gain of the transceiver 14 by the AND gate 122, which converts the gain control signal $S_{ctrl\_proc}$ to the transceiver gain control signal $S_{ctrl\_tx}$ for controlling the transceiver power gain of the transceiver 14. Further in Step S510, the control logic circuit 12 can also control the PA power gain of the PA 16 by the OR gate 120, which converts the gain control signal $S_{ctrl\_proc}$ to the PA gain control signal $S_{ctrl\_pa}$ for controlling the PA power gain of the PA 16. The detailed relationship for how the gain control signal $S_{ctrl\_proc}$ is converted to the transceiver gain control signal $S_{ctrl\_tx}$ and the PA gain control signal $S_{ctrl\_pa}$ can find reference in Table 1.

The gain control methods 4 and 5 provide power amplification methods for the mobile communication device 1 to amplify the power of the input signal by one of the four possible levels, while preserving linearity of the device.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A mobile communication device, comprising:
   a processor, configured to generate a baseband signal in a digital form, and produce a gain control signal;
   a transceiver circuit, coupled to the processor, configured to convert the baseband signal from the digital form to an analog form and to amplify the converted baseband signal to output a first transmission signal at one of a first plurality of power gain levels;
   an amplifier circuit, coupled to the transceiver circuit, configured to amplify the first transmission signal at one of a second plurality of power gain levels to output a second transmission signal to an antenna for transmission; and
   a control logic circuit, coupled to the processor, the transceiver circuit and the amplifier circuit, configured to select said ones of the first and second pluralities of power gain levels for the transceiver and the amplifier circuit respectively, based on the gain control signal such that the second transmission signal has an overall power gain,
   wherein the control logic circuit is configured to control said one of the first plurality of power gain levels of the transceiver circuit to switch among the first plurality of power gain levels in a stepwise and sequential order by no more than 1-level difference of the first plurality of power gain levels, and control said one of the second plurality of power gain levels of the amplifier circuit to switch among the second plurality of power gain levels in a stepwise and sequential order by no more than 1-level difference of the second plurality of power gain levels, and wherein the overall power gain is one of a third plurality of power gain levels determined by the first and second pluralities of power gain levels.

2. The mobile communication device of claim 1, wherein the transceiver circuit is capable to adopt a lowest power gain level of the first plurality of power gain levels only if the amplifier circuit has adopted the lowest power gain level of the second plurality of power gain levels.

3. The mobile communication device of claim 1, wherein the control logic circuit comprises:
an OR gate, coupled to the amplifier circuit; and
an AND gate, coupled to the transceiver.

4. The mobile communication device of claim 1, wherein:
the control logic circuit is configured to receive the gain control signal to generate a transceiver gain control signal and an amplifier gain control signal, and send the transceiver gain control signal and the amplifier gain control signal to the transceiver circuit and amplifier circuit respectively;
the transceiver circuit is configured to amplify the converted baseband signal with a transceiver power gain according to the transceiver gain control signal;
the amplifier circuit is configured to amplify the first transmission signal with an amplifier power gain according to the amplifier gain control signal;
the transceiver power gain has 2 possible levels, and the amplifier power gain has 3 possible levels.

5. The mobile communication device of claim 4, wherein the transceiver power gain can be adjusted to the lowest level of the first plurality of power gain levels only when the amplifier power gain is at the lowest level of the second plurality of power gain levels.

6. The mobile communication device of claim 4, wherein the control logic circuit is configured to switch the transceiver power gain and the amplifier power gain by no more than 1-level difference of the first and second pluralities of power gain levels, respectively.

7. The mobile communication device of claim 1, wherein the control logic circuit comprises logic gates.

8. A mobile communication device, comprising:
a processor, configured to generate a baseband signal in a digital form, and produce a gain control signal;
a transceiver circuit, coupled to the processor, configured to convert the baseband signal from the digital form to an analog form and to amplify the converted baseband signal to output a first transmission signal at one of a first plurality of power gain levels;
an amplifier circuit, coupled to the transceiver circuit, configured to amplify the first transmission signal at one of a second plurality of power gain levels to output a second transmission signal to an antenna for transmission; and
a control logic circuit, comprising:
an AND gate, coupled to the transceiver circuit, configured to control the transceiver to amplify the converted baseband signal based on the gain control signal;
an OR gate, coupled to the amplifier circuit, configured to control the amplifier circuit to amplify the first transmission signal based on the gain control signal; and
wherein the control logic circuit is configured to control said one of the first plurality of power gain levels of the transceiver circuit to switch among the first plurality of power gain levels in a stepwise and sequential order by no more than 1-level difference of the first plurality of power gain levels, and control said one of the second plurality of power gain levels of the amplifier circuit to switch among the second plurality of power gain levels in a stepwise and sequential order by no more than 1-level difference of the second plurality of power gain levels.

9. The mobile communication device of claim 8, wherein the converted baseband signal is increased in power by an overall power gain to be the second transmission signal, and
the overall power gain is one of a third plurality of power gain levels determined by the first and second pluralities of power gain levels.

10. The mobile communication device of claim 9, wherein the control logic circuit is configured to switch the overall power gain by no more than 1-level difference of the third plurality of power gain levels.

11. The mobile communication device of claim 9, wherein the overall power gain has four possible levels.

12. The mobile communication device of claim 8, wherein:
the processor is configured to generate a gain control signal;
the AND gate and the OR gate are configured to receive the gain control signal to generate a transceiver gain control signal and an amplifier gain control signal, and send the transceiver gain control signal and the amplifier gain control signal to the transceiver circuit and amplifier circuit respectively;
the transceiver circuit is configured to amplify the converted baseband signal with a transceiver power gain according to the transceiver gain control signal;
the amplifier circuit is configured to amplify the first transmission signal with an amplifier power gain according to the amplifier gain control signal;
the transceiver power gain has 2 possible levels, and the amplifier power gain has 3 possible levels.

13. The mobile communication device of claim 12, wherein the transceiver power gain can be adjusted to the lowest level of the first plurality of power gain levels only when the amplifier power gain is at the lowest level of the second plurality of power gain levels.

14. The mobile communication device of claim 8, wherein the control logic circuit is configured to switch the transceiver power gain and the amplifier power gain by no more than 1-level difference of the first and second pluralities of power gain levels, respectively.

15. A method, providing a gain control by a mobile communication device, comprising:
generating, by a processor, a baseband signal in a digital form;
generating, by the processor, a gain control signal;
converting, by a transceiver circuit, the baseband signal from the digital form to an analog form;
controlling, by a logic control circuit, the transceiver circuit by a first power gain at one of a first plurality of power gain levels and an amplifier circuit by a second power min at one of a second plurality power gain levels based on the gain control signal to amplify the converted baseband signal to a second transmission signal by an overall power gain at one of a third plurality of power gain levels;
controlling, by the logic control circuit, said one of the plurality of power gain levels to switch among the plurality of power gain levels at a stepwise and increasing sequence; and
switching the overall power gain by no more than 1-level difference of the plurality of power gain levels;

wherein the overall power gain is one of the third plurality of power gain levels determined by the first and second pluralities of power gain levels.

16. The method of claim 15, wherein controlling step further comprises:
providing an OR gate coupled to the amplifier circuit; and
providing an AND gate coupled to the transceiver.

17. The method of claim 15, wherein:
the controlling step comprises receiving, by the logic control circuit, the gain control signal to generate a transceiver gain control signal and an amplifier gain control signal, and sending the transceiver gain control signal and the amplifier gain control signal to the transceiver circuit and amplifier circuit respectively;
amplifying the converted baseband signal with a transceiver power gain at one of a first plurality of power gain levels according to the transceiver gain control signal to output a first transmission signal;
amplifying the first transmission signal with an amplifier power gain at one of a second plurality of power gain levels according to the amplifier gain control signal to output the second transmission signal; and
the transceiver power gain has 2 possible levels, and the amplifier power gain has 3 possible levels.

18. The method of claim 17, wherein the transceiver power gain can be adjusted to the lowest level of the first plurality of power gain levels only when the amplifier power gain is at the lowest level of the second plurality of power gain levels.

19. The method of claim 17, further comprises switching, by the logic control circuit, the transceiver power gain and the amplifier power gain by no more than 1-level difference of the first and second pluralities of power gain levels, respectively.

20. A method, providing a gain control by a mobile communication device, comprising:
generating, by a processor, a baseband signal in a digital form;
generating, by the processor, a gain control signal;
converting, by a transceiver circuit, the baseband signal from the digital form to an analog form;
controlling, by an AND gate of a control logic circuit, the transceiver to amplify the converted baseband signal to a first transmission signal by one of a first plurality of power gain levels based on the gain control signal;
controlling, by an OR gate of the control logic circuit, an amplifier to amplify the first transmission signal to a second transmission signal by one of a second plurality of power gain levels based on the gain control signal;
controlling, by the logic control circuit, said one of the first plurality of power gain levels of the transceiver circuit to switch among the first plurality of power gain levels in a stepwise and sequential order by no more than 1-level difference of the first plurality of power gain levels; and
controlling, by the logic control circuit, said one of the second plurality of power gain levels of the amplifier circuit to switch among the second plurality of power gain levels in a stepwise and sequential order by no more than 1-level difference of the second plurality of power gain levels.

21. The method of claim 20, further comprising:
generating, by the processor, a gain control signal;
receiving, by the AND gate and the OR gate, the gain control signal to generate a transceiver gain control signal and an amplifier gain control signal; and
sending, by the AND gate and the OR gate, the transceiver gain control signal and the amplifier gain control signal to the transceiver circuit and amplifier circuit respectively;
wherein the amplifying by the transceiver circuit step comprises amplifying the converted baseband signal with a transceiver power gain according to the transceiver gain control signal;
the amplifying by the amplifier circuit step comprises amplifying the first transmission signal with an amplifier power gain according to the amplifier gain control signal;
the transceiver power gain has 2 possible levels, and the amplifier power gain has 3 possible levels.

22. The method of claim 21, wherein the transceiver power gain can be adjusted to the lowest level of the first plurality of power gain levels only when the amplifier power gain is at the lowest level of the second plurality of power gain levels.

23. The method of claim 21, further comprises switching, by the logic control circuit, the transceiver power gain and the amplifier power gain by no more than 1-level difference of the first and second pluralities of power gain levels, respectively.

* * * * *